United States Patent [19]

Seney

[11] 4,067,234
[45] Jan. 10, 1978

[54] TENSION TRANSDUCER

[75] Inventor: John Seymour Seney, Seaford, Del.

[73] Assignee: E. I. Du Pont de Nemours and Company, Wilmington, Del.

[21] Appl. No.: 751,210

[22] Filed: Dec. 16, 1976

[51] Int. Cl.² .......................... G01L 5/08; G01L 5/10
[52] U.S. Cl. .......................................... 73/144; 73/160
[58] Field of Search ................ 73/95.5, 143, 160, 144

[56] References Cited

U.S. PATENT DOCUMENTS

| 3,204,454 | 9/1965 | Friman et al. | 73/143 |
| 3,739,633 | 6/1973 | Saxl | 73/144 |
| 3,824,846 | 7/1974 | Andersson | 73/144 |

Primary Examiner—James J. Gill

[57] ABSTRACT

A tension transducer for measuring threadline tension in running lengths of yarn includes a beam over which yarn passes cantilevered to one leg of a U-shaped flexure member. The other leg of the U-shaped member is associated with a strain gage linked internally to the beam.

5 Claims, 8 Drawing Figures

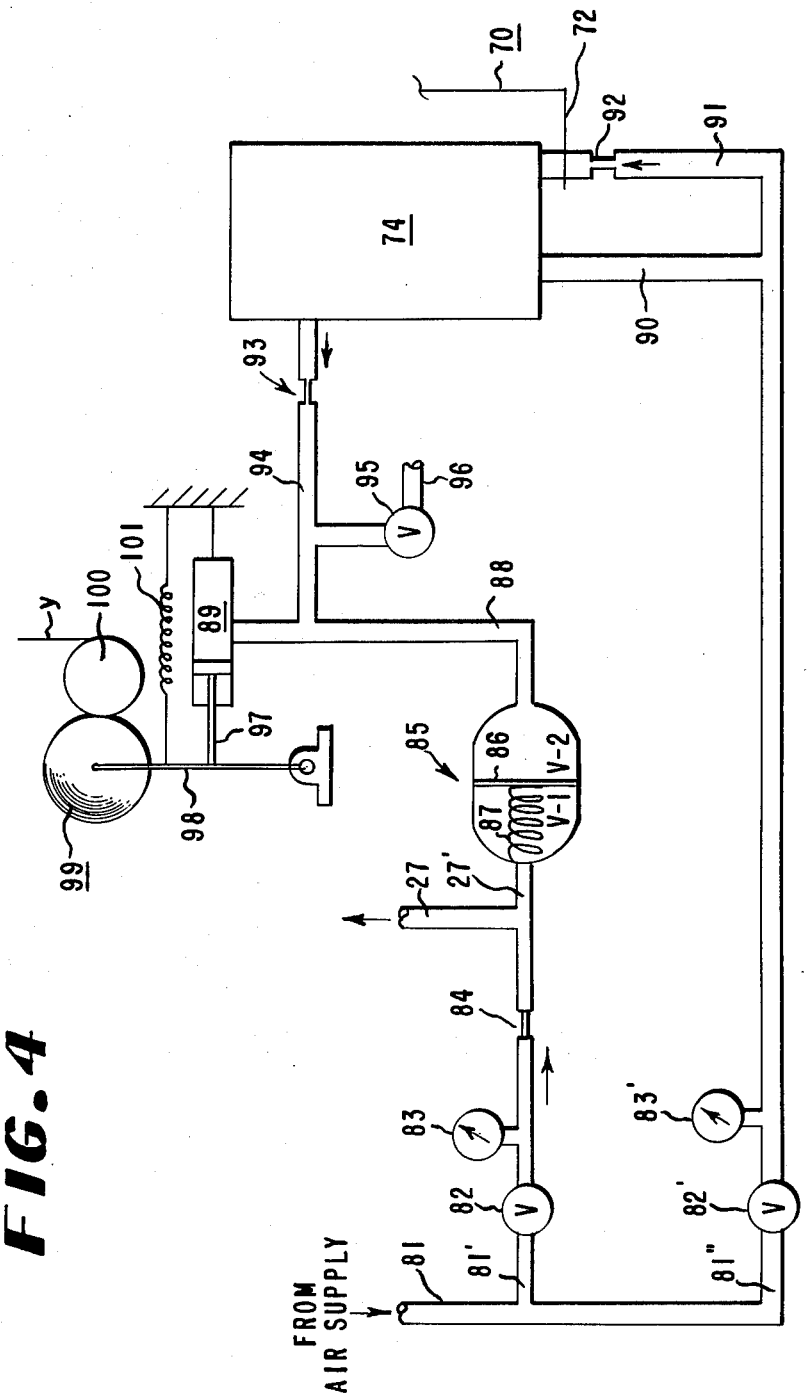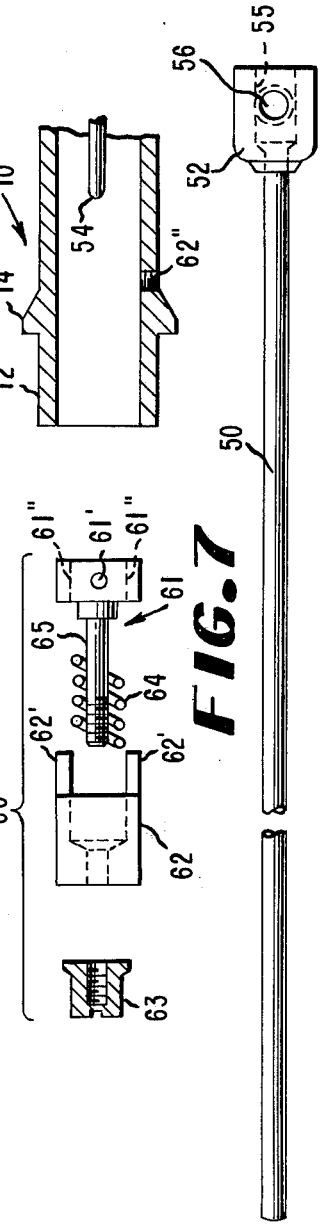

TENSION TRANSDUCER

BACKGROUND OF THE INVENTION

This invention relates to the measurement and control of tension in a moving elongate flexible element such as a threadline, and more particularly to a precision tensiometer of unusually rugged structure which is insensitive to vibration and able to withstand large mechanical shocks. Although not restricted to such use, this invention is particularly applicable to the measurement of tension in continuous textile yarn while it is being manufactured and wound on packages at the end of a high-speed spinning machine.

Tension transducers have taken many forms in the past. For example, Nieuweboer in U.S. Pat. No. 3,444,731, teaches the use of a guide pin supported in a resilient linkage under constraint and with displacement transducers to measure the effects of yarn tension. Harvey in U.S. Pat. No. 3,376,740, shows a tensiometer designed to reduce vibration effects. He uses twin, back-to-back elastic sensing arms each with a strain gage thereon and with yarn running over only one arm. Output signals from each gage are connected in such a way as to reduce signal noise due to mechanical vibration. Roberts in U.S. Pat. No. 3,512,406 shows a robust tensiometer comprising a long cylindrical guide cantilevered from a support and provided with a strain gage near its supported end. Although these guides each have some important attributes either of ruggedness or of ability to suppress vibration effects, none is sufficiently sensitive, nor do they combine the ability to withstand shocks (such as being struck by a sucker gun during stringup) as well as being able to suppress machine vibration effects.

SUMMARY OF THE INVENTION

These disadvantages are overcome by a tension sensor comprising a rugged, thick-walled hollow cylindrical yarn guiding beam supported at one end by one leg of a distorted U-shaped flexible fixture. The other leg of the U-shaped fixture is attached to a frame such as that of a windup and the base of the "U" is constructed with a thin flexure section between the two legs. An elongate slender rod for coupling strain-caused motion to the strain transducer is mounted coaxially inside the guiding beam. One end of this rod is supported in a zero-adjust device near the outer end of the beam. This device is designed to provide for axially positioning this rod. The other end of the rod is arranged to actuate a strain transducer associated with the second leg of the U-shaped fixture. In one embodiment, which employs an electrical strain gage transducer, the inner end of the rod is attached to the sensing member of a resistance strain gage whose body is fixed to the second leg of the "U". In another embodiment the inner end of the rod is arranged to flex a modulator leaf, one end of which is fixed to the second leg of the "U". The other end of this leaf comprises an air flow modulation flag associated with the control port of a pneumatic amplifier. The output signals from the strain transducers are used to provide a tension readout. These output signals may also be used to regulate windup speed by regulating pressure between a windup drive roll and its associated surface driven yarn package or to regulate drive roll speed directly. Consequently, yarn winding tension is regulated.

BRIEF DESCRIPTION OF THE DRAWINGS

FIG. 4 is a pneumatic circuit diagram showing an application of the pneumatic tension senser of FIG. 2 when employed to regulate the pressure between a windup package and its drive roll;

FIG. 6 is an exploded view of the zero-adjust device employed inside the guiding beam in association with one end of the flexible strain coupling rod; and FIG. 7 is a side view of the flexible strain coupling rod.

DETAILED DESCRIPTION OF THE PREFERRED EMBODIMENT

Figure 1:
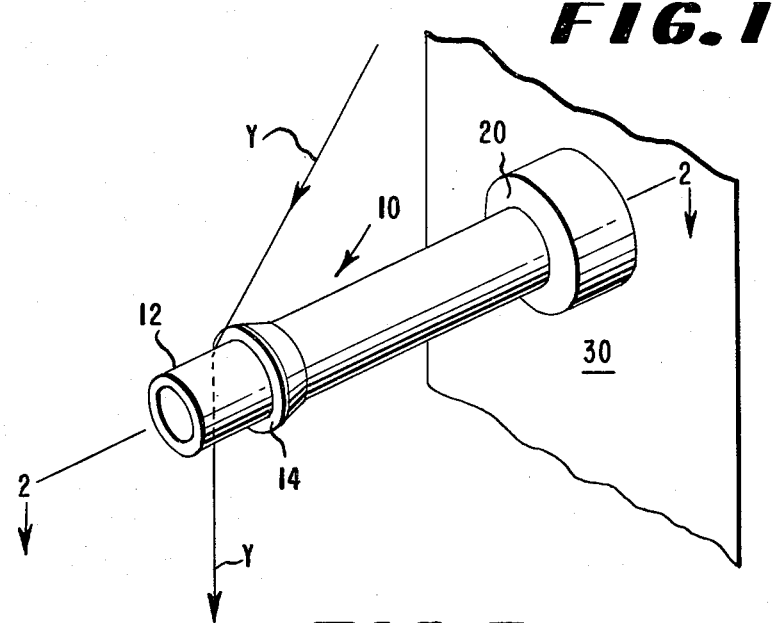
FIG. 1 is an isometric view of the yarn guiding beam in association with the frame of a yarn windup.

The device of this invention is seen from FIG. 1 to include a massive, hollow, yarn-guiding beam 10 cantilevered by means of beam mount and housing structure 20 to the frame 30. In the case of the preferred embodiment, this frame is that of a high-speed yarn manufacturing apparatus for which beam 10 forms the so-called fanning guide. Thus, the end 12 of beam 10 is preferably constructed of ceramic yarn guiding material to receive a running yarn y at a slight wrap angle so that the tension in yarn y exerts a force on beam 10. A collar 14 is provided to restrict the axial location of yarn y.

Figure 3:
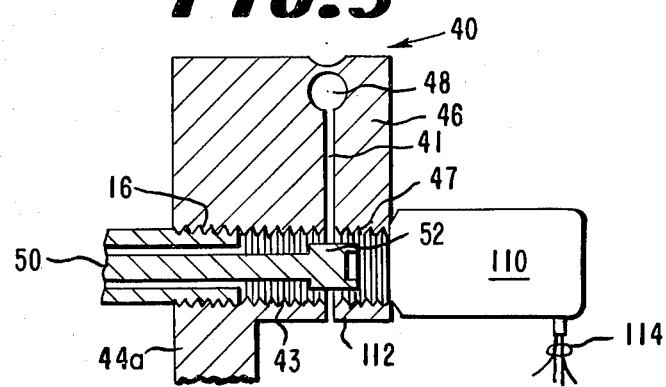
FIG. 3 is a similar cross-sectional view wherein the strain-sensing structure employs an electrical resistance-type strain gage.
Figure 2:
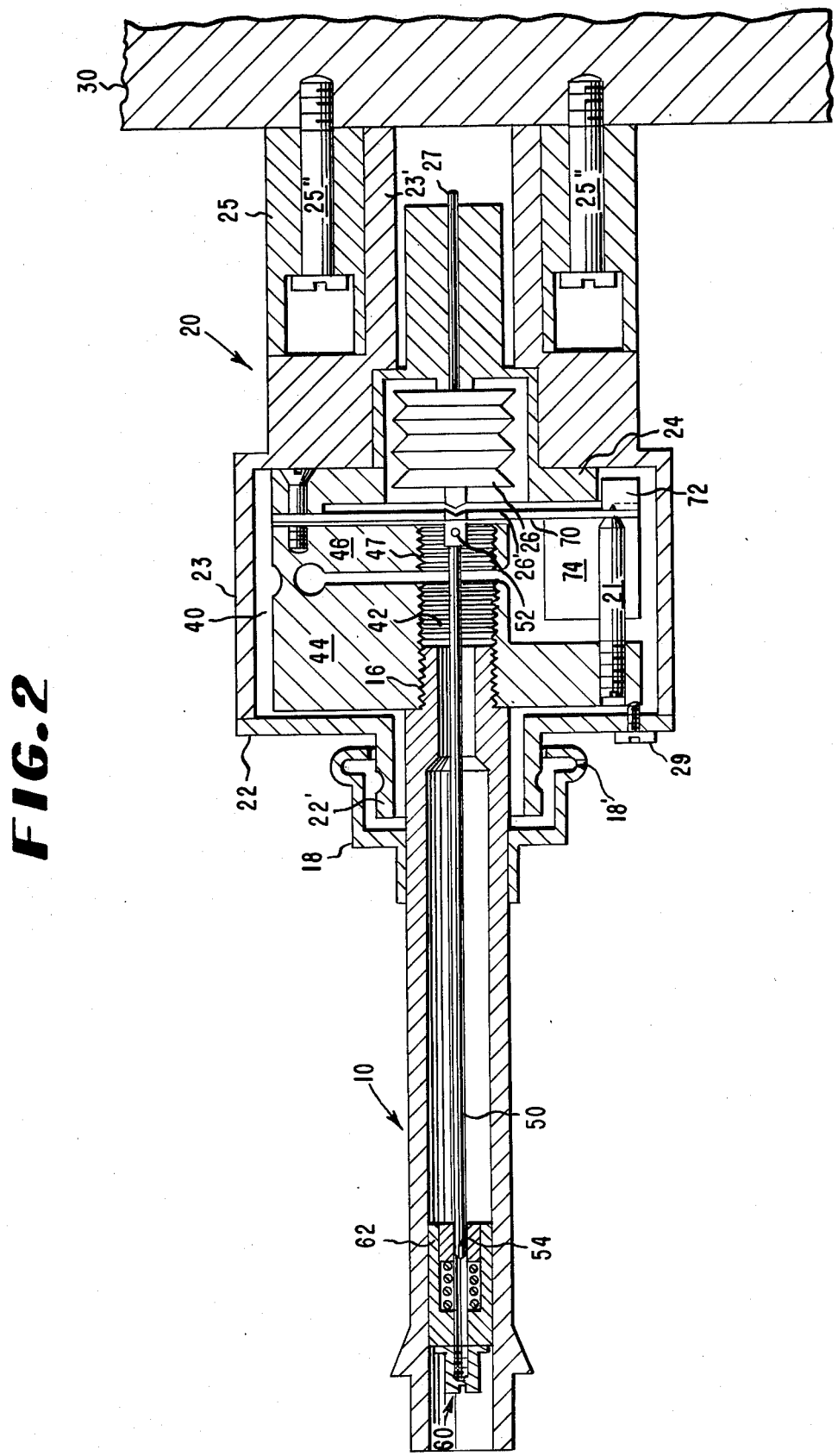
FIG. 2 is a cross-sectional view of the guiding beam and its internal pneumatic tension sensing structure, the view being taken in the direction of arrows 2—2 of FIG. 1.

FIGS. 2 and 3 show that beam 10 includes a threaded inner end 16 to fit into a tapped bore 42 in the first leg 44 of U-shaped fixture 40. The second leg 46 of fixture 40 is attached to an internal part 24 (FIG. 2) of mount 20. Beam 10 is typically of Type 2040-T4 aluminum tubing 5¼ inches (13.3 cm) long by ¾ inch (1.9 cm) O.D. and ½ inch (1.27 cm) ID. Details of fixture 40 are provided in FIGS. 5A and 5B, as described below.

A flexible strain coupling rod 50 is mounted coaxially inside beam 10. The inner end 52 of rod 50 is attached to the sensing portion of a pneumatic or an electric type strain transducer. The outer end 54 of rod 50 is held in a zero-adjust mounting 60, details of which are given below by reference to FIG. 6.

Two embodiments of the invention are shown by reference to FIGS. 2 and 3. The embodiment of FIG. 2 employs a pneumatic strain transducer whereas that of FIG. 3 employs an electrical resistance strain gage. Both embodiments employ the same U-shaped fixture 40, details of which are evident from FIGS. 5A and 5B.

Thus, fixture 40 is constructed from a heavy block of, for example, AISI 1095 steel (heat treated for best spring performance after machining) having overall dimensions about 2¼ by 2¾ by 1⅜ inches (5.7 × 7 × 3.5 cm). The inner or second leg 46 of this fixture is about ⅜ inch (9.5 mm) thick whereas the outer leg 44 is approximately one inch (2.54 cm) thick over its upper portion and ½ inch (1.3 cm) thick over its lower portion 44a. A slot 41 of a little less than 1/10 inch (2.5 mm) width separates legs 44, 46. The inner end of the slot opens up into a cylindrical bore 48. A corresponding semi-circular milled depression 48' is arranged to provide a thin, flexure section 49 connecting the two legs 44, 46 of this fixture. A tapped bore 42 in leg 44 is provided to receive the threaded end of beam 10. Similarly, a tapped bore 47 in leg 46 is provided to receive the threaded mounting end of an electrical strain gage when such is used (FIG. 3). A lower tapped bore 43 is provided in lower leg 44a to receive inward-motion limit screw 21 (FIG. 2).

The flexible strain coupling rod 50 is constructed of material having the same temperature coefficient of expansion as the guiding beam 10. In the case of the preferred embodiment, this material was chosen to be type 2024-T4 aluminum, approximately 1/10 inch (2.5 mm) in diameter and 6 inches (15.0 cm) long. The outer end 54 of rod 50 (FIG. 7) is rounded and the inner end 52 is provided with an enlarged portion which has a bore 55. In the case of the embodiment using a pneumatic strain gage this bore 55 is sized to receive a boss extending from a modulator leaf 70 to be described in connection with FIG. 2 below. In the case of the embodiment which employs an electrical resistance strain gage, bore 55 in end 52 is threaded to receive the sensor end of the strain gage. A transverse tapped bore 56 is provided to receive a set screw in the case of the pneumatic sensor embodiment (FIG. 7).

The outer end of rod 50 is adjustably held inside yarn guiding beam 10 by means of zero adjust device 60. This is seen from FIG. 6 to comprise four cooperating parts. A zero-adjust adapter 61 is attached to the outer end 54 of rod 50 by means of set screw 61'. A fixed bushing 62 is locked inside the yarn guiding beam 10 by means not shown. Fingers 62' on bushing 62 fit corresponding axial slots 61" in the adapter 61 to prevent its rotation. A zero-adjust nut 63 is provided and threaded to fit the threaded shank 65 of adapter 61. A compression spring 64 is fitted over shank 65 and provides a restoring force between adapter 61 and bushing 62. Thus when this arrangement is assembled inside the end of yarn guiding beam 10 with adapter 61 attached to the outer end 54 of rod 50 and bushing 62 attached by means of a set screw 62" to the beam, nut 63 may be turned to adjust the linear position of end 54 of rod 50. This provides zero adjustment for the output of the strain gage.

Turning now to FIG. 2 the structure of the embodiment employing a pneumatic strain gage will be described, much of the structure being the same for the pneumatic and electrical resistance strain gage embodiments. Thus the mounting for the apparatus includes a housing end plate 22 which is attached to a main body and housing structure 23. This is constructed to cover the internal instrument elements and is provided with a cylindrical end portion 23' dimensioned to fit inside a bore of mounting ring 25. Ring 25 is, in turn, fastened such as by bolts 25' and 25" to the frame 30 of the spinning machine. An internal adapter plate 24 is arranged to support fixture 40 inside structure 23.

A housing seal drip cover 18 is constructed as part of yarn guiding beam 10 so as to fit around outward extending hollow boss 22' of end plate 22. This drip cover is provided to inhibit the entrance of undesired materials such as a spin finish from the yarn to the inner elements of the instrument. A drain hole 18' is provided in the bottom of the drip cover.

As noted above, sensing beam 10 is threaded into leg 44 of U-shaped flexure fixture 40 and contains strain amplifying rod 50 coaxial therewith. Inner end 52 of rod 50 is attached to a flat flexible modulator leaf 70. The upper end of leaf 70 is fixed by fasteners to the other leg 46 of fixture 40. Leaf 70 is made, for example, from a thin (0.02 inch, i.e., 0.5 mm) plate of beryllium copper. A modulator flag 72 is attached to one end of leaf 70 and a pneumatic amplifier 74 is located so that flag 72 controls air to the control port of this amplifier. Thus the motion of flag 72 modulates the output of amplifier 74. Air of regulated pressure is imposed through conduit 27 to bellows 26 to provide set point adjustment of the pneumatic transducer. End 26' of the bellows is arranged to contact the inner surface of leaf 70 so that air pressure received over conduit 27 into bellows 26 forces tip 26' against the leaf 70 at a point opposite the position of attachment of end 52 of rod 50.

As noted above an inward-motion limit screw 21 is threaded through lower portion 44a of leg 44 of fixture 40 and dimensioned to approach the near surface of internal adapter plate 24. Thus screw 21 restricts the inward motion of leg 44. Similarly, a second limit screw 29 is provided in end plate 22 and threaded therethrough so that its tip approaches the outer surface of leg 44 and provides a small gap between it and leg 44 so as to restrict the outward motion of leg 44.

In one application of this pneumatic embodiment of the yarn tension sensor the output is used to regulate yarn winding tension as shown in the pneumatic diagram of FIG. 4. Thus a high pressure air supply is connected to conduit 81 which in turn branches to two conduits 81' and 81". A first air pressure regulator valve 82 is located in branch 81' to provide air of adjustable pressure past gage 83 and through fixed pneumatic resistance 84 to the air conduit 27 for the set point bellows 26 of FIG. 2. A branch 27' of conduit 27 extends to a spring-loaded diaphragm device 85. Device 85 is divided by a flexible diaphragm 86 into two compartments V-1 and V-2. A coil spring 87 provides additional restoring force for diaphragm 86. This arrangement provides negative feedback to the set point bellows 26 for increased instrument stability as described later. Conduit 27' is connected to compartment V-1 and a second conduit 88 extends from compartment V-2 to an air cylinder device 89.

The output from regulator 82' is first connected to conduit 90 and thence to the air supply inlet of pneumatic amplifier 74. The output of valve 82' is also connected by a branch conduit 91 through a fixed pneumatic resistance 92 to the control inlet port of amplifier 74. The air control nozzle of this port is located adjacent the air modulator flag 72 of tension sensor leaf 70. The output from pneumatic amplifier 74 extends through fixed pneumatic resistor 93 and over conduit 94 to join conduit 88 in its connection to cylinder 89. A branch fron conduit 94 passes to a relief valve 95 to conduit 96 and thence to the atmosphere.

The piston rod 97 of air cylinder 89 is connected to the support arm 98 for yarn package 99 which is being surface driven by drive roll 100. A return spring 101 furnishes a return force against the force of air cylinder 89. In this way the output of amplifier 74 serves to vary the pressure between yarn package 99 and drive roll 100.

In the case of the embodiment employing an electrical strain gage a few modifications are made. The modulator leaf, amplifier, bellows, and associated structure including adapter plate 24 are eliminated. An electric resistance strain gage (such as unbonded Statham gage made by Statham Instruments, Inc., Oxnard, CA) is threaded into the tapped bore 47 in leg 46 of fixture 40, as shown in FIG. 3. The inner end 52 of rod 50 is then threaded onto the sensing head 112 of strain gage 110. The output from strain gage 110 is led over wires 114 to a readout device or a windup control system either one being of conventional design. This is used to modulate the drive roll speed through its electrical motor drive if each windup position drive roll has its separate electric motor. However, if several drive rolls are driven by a single motor, the signals from strain gage 110 are used to operate an electrical linear motor in place of cylinder 89 of FIG. 4 and employed to modulate the force between the windup package and the drive roll thus operating to control yarn windup tension, as in the embodiment employing the pneumatic strain gage.

Figure 5A:
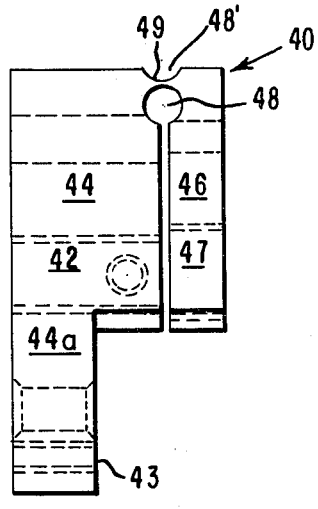
FIG. 5A is a side view of the U-shaped flexible beam fixture.
Figure 5B:
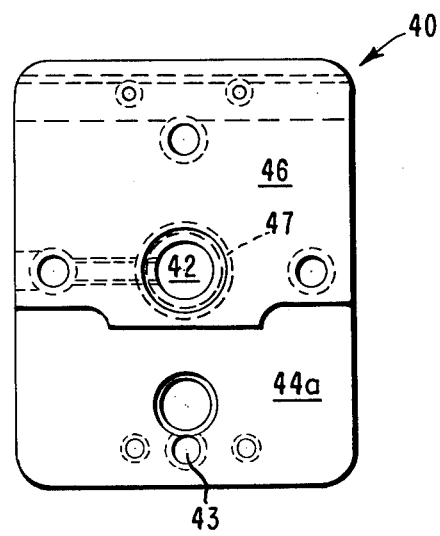
FIG. 5B is an end view of this fixture.

In operation a yarn whose tension is to be monitored is passed at a small but finite angle across guide tip 12 of guiding beam 10 as shown in FIG. 1. Tension in the yarn exerts a force on this beam which by attachment to leg 44 of fixture 40 tends to flex the fixture about its flex point 49 (FIG. 5A). Thus the inner end 52 of rod 50 strains modulator leaf 70 and consequently, moves modulator flag 72 in the control port of amplifier 74. The pneumatic output of this amplifier then will provide a signal which is related to the tension in the yarn. Because of the massive design of beam 10 and fixture 40, machine vibrations are not picked by the tension sensor.

When the device is employed in a yarn tension regulator associated with a surface driven yarn package winding device, the output from the amplifier is employed as shown in FIG. 4 to operate an air cylinder 89 in order to regulate a force between the yarn package and the drive roll.

Limit screws 21 and 29 (FIG. 2) provide for minimizing the possible effects of a sudden strong shock force on beam 10 such as that which might be imposed by striking the beam inadvertently with, for example, a sucker gun during doffing.

The pneumatic circuit has two additional features; namely, the spring-loaded diaphragm device 85 which provides negative feedback for stability in case of surges in yarn tension or sudden shocks on the tension sensing beam 10. This feedback is provided through device 85 and conduit 27 to the set-point bellows.

When the electrical resistance strain gage embodiment is employed, this feature is provided through appropriate design of the electrical control circuitry employed for electrically regulating yarn windup speed and, therefore, tension.

In the pneumatic embodiment, the relief valve 95 (FIG. 4) comprises a solenoid operated valve which is electrically connected to the windup doffing control. This valve is arranged to open just prior to the time that the doffing cycle starts in order to allow high contact pressure between the package and the drive roll at the time of doffing.

A novel structure for a yarn tension sensing device is provided by this invention. This structure results in a highly sensitive tension detector which is rugged and insensitive to vibrations in the mounting. As mentioned the sensor may be used in connection with a tesnion readout to provide indications of tension levels and their changes or it may be employed to actually regulate yarn tension such as during the winding of the yarn onto a package.

What is claimed is:

1. A yarn tension transducer for measuring threadline tension in running lengths of yarn comprising: a frame; a U-shaped member having first and second legs separated by a base member, said base member having a reduced flexure section located between the two legs; a hollow tube over which yarn passes connected to said first leg of said U-shaped member the other leg of said member being connected to said frame; an elongated rod having one end mounted within said hollow tube, a strain transducer connected between said other leg of said U-shaped member and the other end of said elongated rod responsive to relative movement between said other leg and said rod.

2. The apparatus of claim 1, said strain transducer being an electrical resistance strain gage.

3. The apparatus of claim 1, said strain transducer being a pneumatic strain transducer.

4. The apparatus of claim 1, including means mounting said one end of said elongated rod within said hollow tube for adjusting the axial position of said one end.

5. The apparatus of claim 3, including a yarn windup having a drive roll in surface driven engagement with a yarn package onto which said running lengths of yarn are wound and a control system for regulating the force between the drive roll and the package, said control system being responsive to said strain transducer.

* * * * *